US008698652B1

(12) United States Patent
Zhang

(10) Patent No.: US 8,698,652 B1
(45) Date of Patent: Apr. 15, 2014

(54) LARGE-AREA PARKING-MONITORING SYSTEM

(71) Applicants: HangZhou HaiCun Information Technology Co., Ltd., HangZhou (CN); Guobiao ZHANG, Corvallis, OR (US)

(72) Inventor: Guobiao Zhang, Corvallis, OR (US)

(73) Assignees: HangZhou HaiCun Information Technology Co., Ltd, HangZhou, ZheJiang (CN); Guobiao Zhang, Corvallis, OR (US)

( * ) Notice: Subject to any disclaimer, the term of this patent is extended or adjusted under 35 U.S.C. 154(b) by 0 days.

(21) Appl. No.: 13/951,466

(22) Filed: Jul. 26, 2013

Related U.S. Application Data

(60) Provisional application No. 61/757,627, filed on Jan. 28, 2013.

(51) Int. Cl.
*B60Q 1/48* (2006.01)

(52) U.S. Cl.
USPC .......................... 340/932.2; 340/933; 340/937

(58) Field of Classification Search
USPC .................. 340/932.2, 937, 933; 705/13, 418
See application file for complete search history.

(56) References Cited

U.S. PATENT DOCUMENTS

| | | | | |
|---|---|---|---|---|
| 6,285,297 | B1 | 9/2001 | Ball | |
| 7,492,283 | B1 | 2/2009 | Racunas, Jr. | |
| 7,893,848 | B2 * | 2/2011 | Chew | 340/932.2 |
| 2008/0136674 | A1 * | 6/2008 | Jang et al. | 340/932.2 |
| 2008/0165030 | A1 * | 7/2008 | Kuo et al. | 340/932.2 |
| 2009/0138345 | A1 * | 5/2009 | Dawson et al. | 705/13 |
| 2012/0127308 | A1 * | 5/2012 | Eldershaw et al. | 348/143 |

* cited by examiner

*Primary Examiner* — Toan N Pham

(57) ABSTRACT

The present invention discloses a large-area parking-monitoring system. It comprises a plurality of smart-phone-like parking-monitoring devices. Each device monitors multiple parking spaces. The acquired parking occupancy data are transmitted to a parking-management server using cellular communication. The present invention takes advantage of the existing city-wide cellular network and therefore, can monitor parking city-wide at low cost.

12 Claims, 6 Drawing Sheets

LARGE-AREA PARKING-MONITORING SYSTEM

CROSS-REFERENCE TO RELATED APPLICATIONS

This application claims priority of a provisional application entitled “Large-Area Parking Monitoring System”, Sr. No. 61/757,627, filed Jan. 28, 2013.

BACKGROUND

1. Technical Field of the Invention

The present invention relates to the field of electronics, and more particularly, to a large-area parking-monitoring system, e.g. a city-wide parking-monitoring system.

2. Prior Arts

Locating a vacant parking space causes much frustration to motorists. It increases fuel consumption and has a negative impact to the environment. To conserve energy resources and enhance the quality of the environment, it is highly desired to develop a parking-monitoring system, which can transmit substantially real-time parking occupancy data to motorists. Based on the parking occupancy data, a motorist can be guided towards a vacant parking space at destination.

Prior arts disclose many parking-monitoring systems. These systems are suitable for a relatively small parking area, e.g. a parking lot or few city blocks. U.S. Pat. No. 6,285,297 issued to Ball on Sep. 4, 2001 discloses a parking-monitoring system. It comprises multiple cameras at different locations and a central image-processor. Each camera scans a portion of the parking area. The images acquired by these cameras are transmitted to the central image-processor and processed to generate parking occupancy data. Constrained by the high cabling cost, this system can only monitor a small parking area.

U.S. Pat. No. 7,492,283 issued to Racunas, jr. on Feb. 17, 2009 discloses another parking-monitoring system. It comprises an internet-accessible web server storing parking occupancy data and a plurality of detectors collecting the real-time parking occupancy data. Each detector communicates with the web server through a wireless local-area network (WiFi) connection. Because WiFi has a medium range (<100 m), this system can only monitor a small parking area.

The parking-monitoring systems disclosed in prior arts are suitable for a relatively small parking area, but not for a city spanning a few square kilometers. To monitor parking city-wide, the present invention discloses a large-area parking-monitoring system.

OBJECTS AND ADVANTAGES

It is a principle object of the present invention to conserve energy resources and enhance the quality of the environment.

It is a further object of the present invention to provide a city-wide parking-monitoring system at low cost.

It is a further object of the present invention to reduce stress and save time for motorists.

In accordance with these and other objects of the present invention, a large-area parking-monitoring system is disclosed.

SUMMARY OF THE INVENTION

The present invention discloses a large-area parking-monitoring system. It comprises a plurality of smart-phone-like parking-monitoring devices. Each device monitors multiple parking spaces and generates parking occupancy data at predetermined times. These data are transmitted to a parking-management server using land-based long-range wireless communication means, preferably using cellular communication means. The parking-management server collects parking occupancy data from various parking-monitoring devices and compiles them into a parking occupancy data-base. This data-base can be integrated with an electronic map (e.g. Google map). Before a motorist arrives at a destination, the parking occupancy data associated with the destination are retrieved from the parking-management server. These data are used to guide the motorist to a selected vacant parking space.

Taking advantage of the existing cellular communication infra-structure, the large-area parking-monitoring system can be deployed at low cost. First of all, by running an image-recognition app, almost any smart-phone (or even a bare-bone cellular phone) can be used to monitor parking. With the rapid drop of the smart-phone price, the smart-phone-like parking-monitoring devices can be built inexpensively. Secondly and more importantly, because the cellular network used by the large-area parking-monitoring system to transmit data is already built and covers every city, no extra cables or WiFi access points need to be installed. Overall, the present invention can monitor city-wide parking at low cost.

Figure 1:
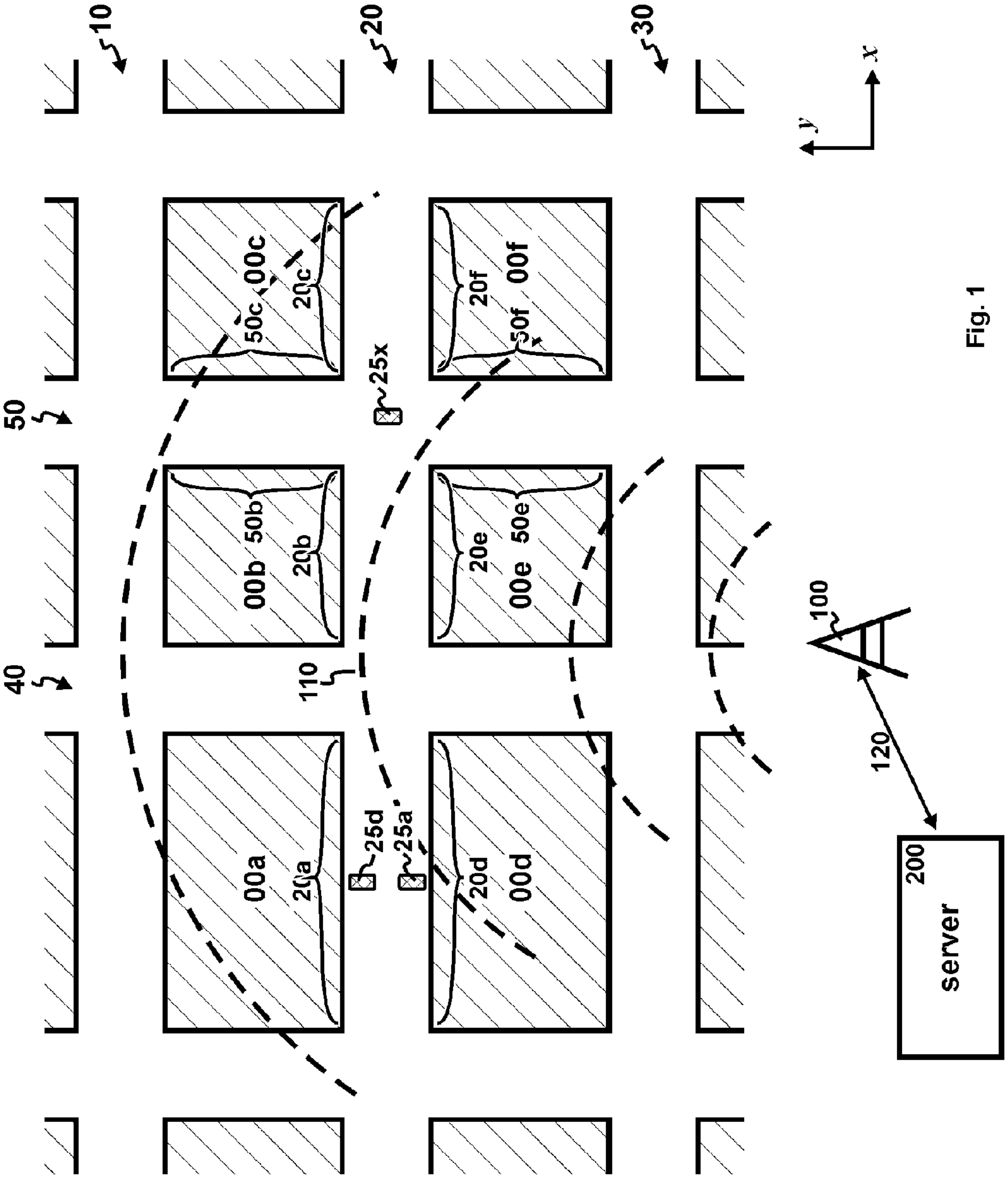
FIG. 1 illustrates a preferred large-area parking-monitoring system deployed in several city blocks.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Referring now to FIG. 1, a preferred large-area parking-monitoring system deployed in several city blocks 00*a*-00*f* is disclosed. These city blocks 00*a*-00*f* are defined by x-streets (i.e. streets oriented along the x direction) 10, 20, 30 and y-street (i.e. streets oriented along the y direction) 40, 50. Vehicles can be parked along curbs, e.g. along the curb 20*a* of the street 20 within the block 00*a*; or, along the curb 50*b* of the street 50 within the block 00*b* . . . . The preferred large-area parking-monitoring system comprises a plurality of parking-monitoring devices 25*a*, 25*d*, 25*x* . . . . In this example, device 25*a* (or, 25*d*) monitors parking occupancy along a single curb 20*a* (or, 20*d*) of a large block 00*a* (or, 00*d*), while device 25*x* monitors parking occupancy along eight curbs (20*b*, 20*c*, 20*e*, 20*f*, 50*b*, 50*c*, 50*e*, 50*f*) of four smaller blocks (00*b*, 00*c*, 00*e*, 00*f*).

While monitoring parking, the parking-monitoring devices (e.g. 25*a*, 25*d*, 25*x* . . . ) generates parking occupancy data at pre-determined times. These data are transmitted to a base station 100 using a preferred communication means 110. In this example, the preferred communication means 110 is a cellular communication means and the base station 100 is a cellular tower. The base station 100 further transmits the parking occupancy data to a parking-management server 200 through an internet connection 120. The internet connection 120 may use wired land lines such as optical fibers. Alternatively, it may use microwave or other means.

The parking-management server 200 manages parking occupancy data. To be more specific, it collects parking occupancy data transmitted from various parking-monitoring devices and compiles these data into a parking occupancy data-base. This data-base stores parking occupancy data for at least a portion of a city and can be integrated with an electronic map. For example, the parking occupancy data can be displayed on Google map. When a motorist needs guidance to a vacant parking space at destination, he may retrieve the corresponding parking occupancy data. The retrieved parking occupancy data may be displayed on a personal computer (PC) and/or a portable device. The portable device could be a vehicle-mounted device or a hand-held device (e.g. a PDA, a smart-phone or a tablet). The portable device may also produce visual and/or audible instructions to the motorist to the selected vacant parking space.

Figure 2A:
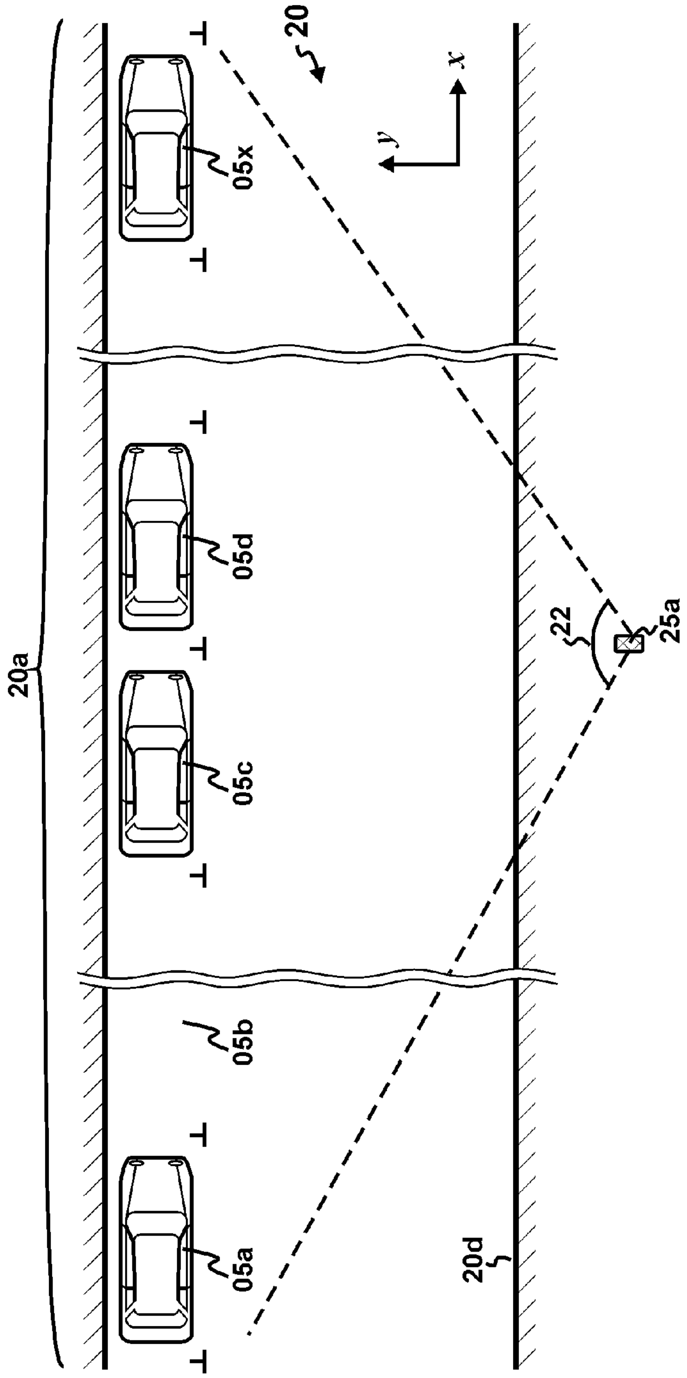
FIGS. 2A-2B illustrate the placement of a preferred parking-monitoring device.
Figure 2B:
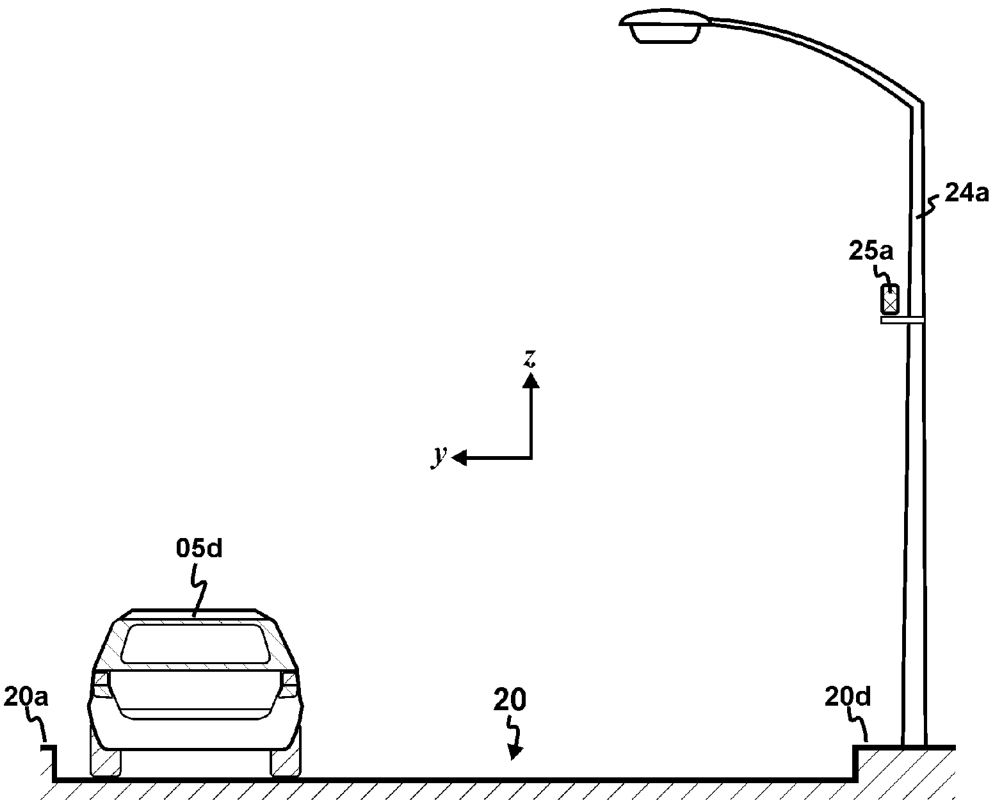

FIGS. 2A-2B illustrate the placement of a preferred parking-monitoring device 25*a*. FIG. 2A is the top view of a curb 20*a* along an x-street 20. There are a plurality of parking spaces 05*a*, 05*b* . . . 05*x* along the curb 20*a*. The parking-monitoring device 25*a* is placed on the opposite curb 20*d* of the street 20 in such a way that the viewing angle 22 of the device 25*a* covers as many parking spaces as possible. FIG. 2B is a cross-sectional view of the street 20. The parking-monitoring device 25*a* is mounted on a support 24*a* such as an utility pole or a street-lamp post. The support 24*a* can provide power to the device 25*a*. The device 25*a* is typically mounted at a position higher than the top of the vehicles parked in the street 20. This arrangement makes it easier for the image-recognition app to differentiate between an occupied parking space and a vacant parking space.

Figure 3:
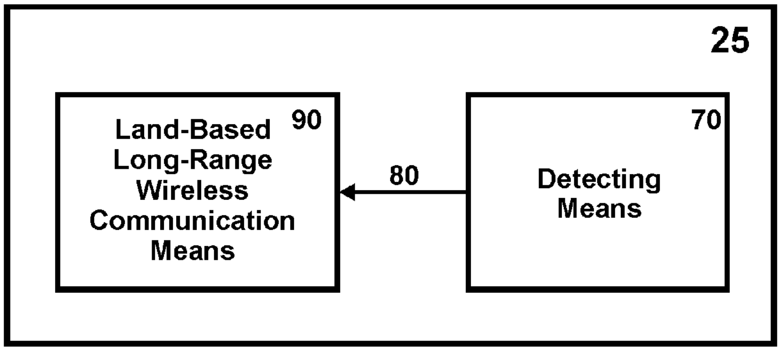
FIG. 3 is a block diagram of a preferred parking-monitoring device.

FIG. 3 is a block diagram of a preferred parking-monitoring device 25. It comprises at least a detecting means 70 and a land-based long-range wireless communication means 90. The detecting means 70 monitors a plurality of parking spaces (e.g. 05*a*, 05*b* . . . 05*x*) and generates the parking occupancy data 80 for these parking spaces at pre-determined times. The parking occupancy data 80 could just be a list of binary numbers, each of which represents the occupancy/vacancy of a parking space. For example, a binary "0" represents an occupied parking space and a binary "1" represents a vacant parking space.

The parking-monitoring device 25 uses the land-based long-range wireless communication means 90 to transmit the parking occupancy data 80 to the base station 100. It has several advantages. First of all, wireless communication does not require cable installation and therefore, saves cabling cost. Secondly, long-range communication can reduce the number of base stations that need to be built. Lastly, land-based long-range wireless communication (e.g. cellular communication) is much less expensive than space-based long-range wireless communication (e.g. satellite communication).

Figure 4:
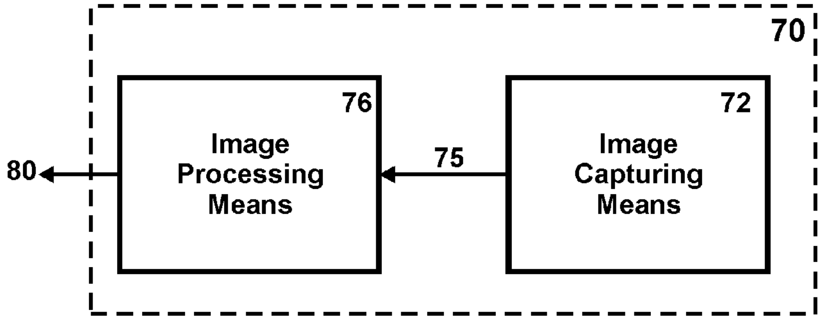
FIG. 4 is a block diagram of a preferred detecting means.

FIG. 4 is a block diagram of a preferred detecting means 70. It comprises an image-capturing means (e.g. a camera) 72 and an image-processing means (e.g. an image processor) 76. The image-capturing means 72 captures the images 75 of the monitored parking spaces (e.g. 05*a*, 05*b* . . . 05*x*) at pre-determined times. The image-processing means 76 processes these images to generate the parking occupancy data 80.

Because the image processor was expensive in the past, a central processor processes images from all cameras in the parking-monitoring system disclosed in U.S. Pat. No. 6,285,297. With the rapid drop of the processor price, cables connecting cameras and processor become a major cost factor (they become more expensive than processors). To avoid excessive cabling cost, the image-processing means 76 is de-centralized in the present invention. In other words, the image-processing means 76 is physically located in close proximity to the image-capturing means 72, and the captured images 75 are processed locally.

Figure 5A:
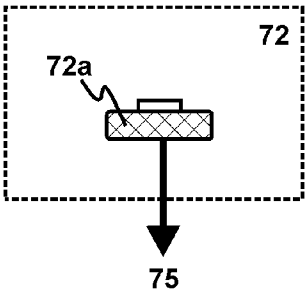
FIGS. 5A-5C illustrate three preferred image-capturing means.
Figure 5B:
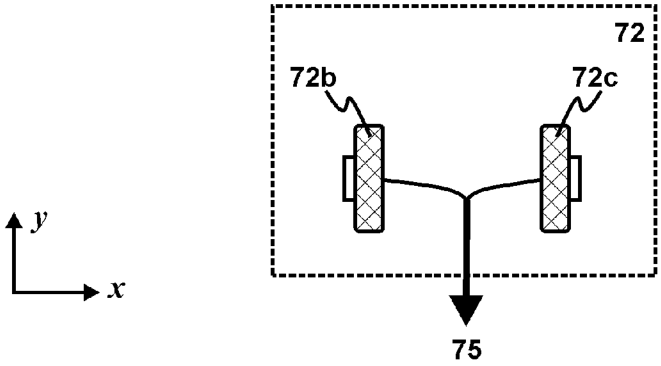
Figure 5C:
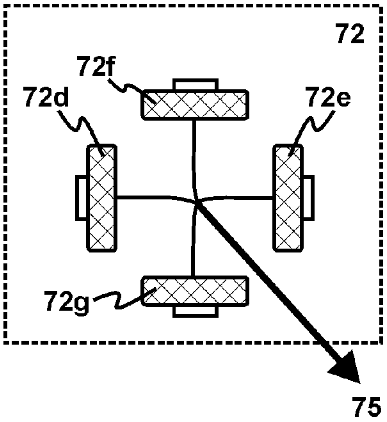

FIGS. 5A-5C illustrate three preferred image-capturing means 72. The preferred embodiment of FIG. 5A comprises a single camera 72*a*. It can monitor parking along a single curb. The preferred embodiment of FIG. 5B comprises two cameras 72*b*, 72*c*. They are physically located in close proximity of each other and face opposite directions. This preferred embodiment can monitor parking along two opposite curbs in a street. The preferred embodiment of FIG. 5C comprises four cameras 72*d*-72*g*. They are physically located in close proximity of each other and the directions they face differ by around ninety degrees (~90°). This preferred embodiment can monitor parking along several (e.g. 4-8) curbs. Apparently, each of the preferred embodiments in FIGS. 5A-5C, more particularly FIGS. 5B and 5C, can monitor a large number of parking spaces simultaneously.

In the parking-monitoring system disclosed in U.S. Pat. No. 6,285,297, a camera is pivoted by an electro-mechanical device to scan a parking area. As is well known to those skilled in the art, any device with moving parts is prone to mechanical failure. Instead of using an electro-mechanical device, the preferred embodiments of FIGS. 5B-5C use multiple cameras facing different directions to increase the number of parking spaces that can be monitored simultaneously by the parking-monitoring device 25. With the rapid drop of the camera cost, using multiple cameras does not increase cost but improves reliability. As a result, these preferred embodiments incur less operation cost.

Figure 6:
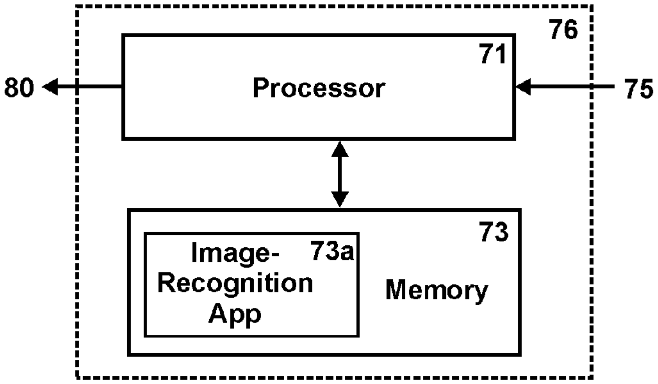
FIG. 6 is a block diagram of a preferred image-processing means.

FIG. 6 is a block diagram of a preferred image-processing means 76. It comprises a processor 71 and a memory 73. The processor 71 could be any type of central-processing unit (CPU) and/or digital signal processor (DSP). The memory 73 could be any type of non-volatile memory (NVM), e.g. flash memory. It stores an operating system of the parking-monitoring device 25. Preferably, this operating system is an operating system of a smart-phone, e.g. iOS, or Android. It further stores an image-recognition application software (app) 73*a*. The memory 73 could also store an image-recognition configuration file, which defines the area corresponding to each parking space. In the case that the parking monitor device 25 is used as a security camera, the memory 73 can be used to store the captured images (e.g. videos) for a period of time.

Figure 7A:
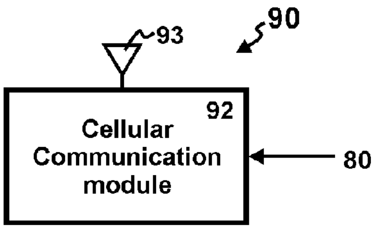
FIGS. 7A-7B illustrate two preferred land-based long-range wireless communication means.
Figure 7B:
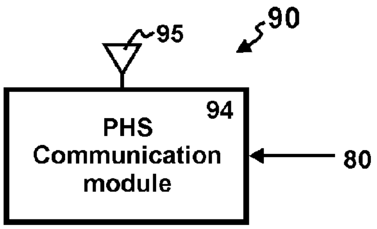

FIGS. 7A-7B illustrate two preferred land-based long-range wireless communication means 90. The preferred wireless communication means 90 typically has a range greater than one hundred meters (>100 m), preferably greater than one kilometer (>1 km). In FIG. 7A, the preferred communication means 90 comprises a cellular communication module 92 and a cellular antenna 93. The cellular communication module could use 2G (e.g. GSM . . . ), 2.5G (e.g. GPRS . . . ), 3G (e.g. UMTS, CDMA2000 . . . ), 4G (e.g. LTE, Mobile WiMAX . . . ) and/or other cellular communication technologies. In FIG. 7B, the preferred communication means 90 comprises a personal handy-phone system (PHS) communication module 94 and a PHS antenna 95. PHS is also referred to as personal access system (PAS) and is widely used Asian countries.

The greatest advantage of using land-based long-range wireless communication means 90 is that it is part of the existing city-wide wireless network. For example, cellular communication means is part of the cellular network, and PHS communication means is part of the PHS network. Using the existing city-wide wireless network (e.g. cellular network or PHS network) to transmit data is the most important aspect to differentiate the present invention from prior arts. The parking-monitoring system disclosed in U.S. Pat. No. 7,492,283 uses WiFi network. Because few cities have city-wide WiFi coverage, prior arts require building a whole new WiFi network, which is expensive. On the other hand, because the cellular network (or, the PHS network) is already built and covers every city, the present invention can monitor parking city-wide at low cost.

Figure 8:
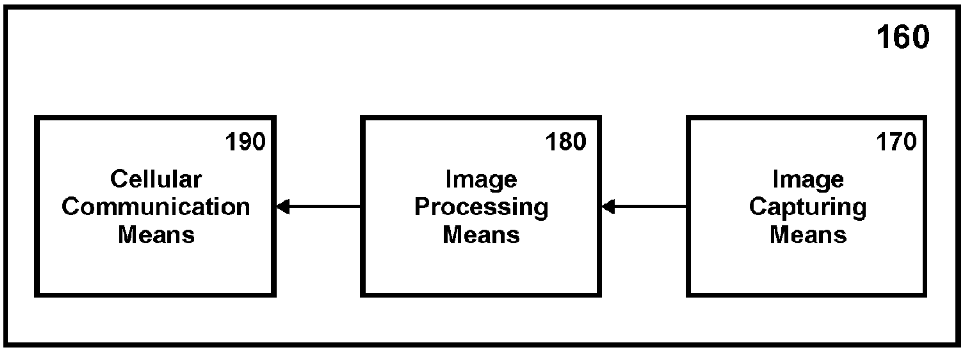
FIG. 8 is a block diagram of a preferred smart-phone-like parking-monitoring device.

FIG. 8 is a block diagram of a preferred smart-phone-like parking-monitoring device. It is a bare-bone smart-phone 160 (e.g. a smart-phone without keypad or screen) and comprises an image-capturing means 170, an image-processing means 180 and a cellular communication means 190. The image-capturing means 170 captures the images of a plurality of parking spaces (e.g. 05*a*, 05*b* . . . 05*x*). The image-processing means 180 processes the captured images to generate parking occupancy data 80. The parking occupancy data 80 are transmitted to a parking-management server 200 through the cellular communication means 190. It should be noted that these components 170, 180, 190 of the parking-monitoring device 160 are physically located in close proximity to each other, preferably they are located in a single housing. In fact, by running an image-recognition app, almost any smart-phone can be used to monitor parking.

The present invention further discloses a smart-phone-based parking-monitoring and guidance system. A first plurality of smart-phones (or smart-phone-like devices) are deployed city-wide to monitor parking occupancy. These smart-phones transmit the parking occupancy data to a parking-management server using cellular communication. A second plurality of smart-phones are carried by motorists. These smart-phones can retrieve the parking data from the parking-management server using cellular communication. They also provide visual/audible guidance to motorists to the selected vacant parking spaces at destinations.

For a city spanning a few square kilometers, the preferred parking-monitoring system may comprise hundreds to thousands of parking-monitoring devices. It might be wasteful for each parking-monitoring device to have a different cellular subscriber identity, because each device only transmits a small amount of data (e.g. a few bytes) at pre-determined times (e.g. every minute). Accordingly, the present invention further discloses a parking-monitoring system with shared cellular subscriber identity. For example, device 25*a* and 25*d* of FIG. 1 share the same cellular subscriber identity. They are configured to transmit parking occupancy data alternately (e.g. at different times). As a result, this system uses fewer cellular subscriber identities and incurs less cellular charge.

While illustrative embodiments have been shown and described, it would be apparent to those skilled in the art that may more modifications than that have been mentioned above are possible without departing from the inventive concepts set forth therein. For example, besides curb-side parking, the preferred parking-monitoring system can be used to monitor a parking lot. The invention, therefore, is not to be limited except in the spirit of the appended claims.

What is claimed is:

1. A large-area parking-monitoring system comprising:

a first parking-monitoring device comprising a first image-capturing module for capturing first images of a first plurality of parking spaces, a first image processor for processing said first images to generate first parking occupancy data for said first plurality of parking spaces, and a first cellular communication module for transmitting said first parking occupancy data at a first pre-determined interval;

a second parking-monitoring device comprising a second image-capturing module for capturing second images of a second plurality of parking spaces, a second image processor for processing said second images to generate second parking occupancy data for said second plurality of parking spaces, and a second cellular communication module for transmitting said second parking occupancy data at a second pre-determined interval;

wherein said first and second cellular communication modules share the same cellular subscriber identity.

2. The large-area parking-monitoring system according to claim 1, wherein said first and second parking-monitoring devices are configured to transmit parking occupancy data alternately.

3. The large-area parking-monitoring system according to claim 1, wherein said first and second parking-monitoring devices are configured to transmit parking occupancy data at different times.

4. The large-area parking-monitoring system according to claim 1, wherein said first image-capturing module, said first image processor and said first cellular communication module are located in a first housing.

5. The large-area parking-monitoring system according to claim 1, wherein said second image-capturing module, said second image processor and said second cellular communication module are located in a second housing.

6. The large-area parking-monitoring system according to claim 1, wherein selected one of said first and second parking-monitoring devices is mounted on a support in a street.

7. The large-area parking-monitoring system according to claim 6, wherein said support provides power to said selected parking-monitoring device.

8. The large-area parking-monitoring system according to claim 1, wherein selected one of said first and second image-capturing modules comprises a plurality of cameras facing different directions.

9. The large-area parking-monitoring system according to claim 1, further comprising a memory for storing a smart-phone operating system.

10. The large-area parking-monitoring system according to claim 9, wherein said memory further stores an image-recognition app.

11. The large-area parking-monitoring system according to claim 1, further comprising a parking-management server for receiving and managing said first and second parking occupancy data.

12. The large-area parking-monitoring system according to claim 11, wherein a motorist retrieves selected one of said first and second parking occupancy data from said parking-management server.

* * * * *